US011926806B2

(12) United States Patent
Lukic et al.

(10) Patent No.: US 11,926,806 B2
(45) **Date of Patent: *Mar. 12, 2024**

(54) AUTOMATIC DISHWASHING METHOD

(71) Applicant: The Procter & Gamble Company, Cincinnati, OH (US)

(72) Inventors: Nevena Lukic, Brussels (BE); Nilgun Esin Aksoy Abaci, Meise (BE); Patrick Firmin August Delplancke, Steenhuize-Wijnhuize (BE); Serdar Acikalin, Brussels (BE)

(73) Assignee: The Procter & Gamble Company, Cincinnati, OH (US)

( * ) Notice: Subject to any disclaimer, the term of this patent is extended or adjusted under 35 U.S.C. 154(b) by 133 days.

This patent is subject to a terminal disclaimer.

(21) Appl. No.: 17/392,310

(22) Filed: Aug. 3, 2021

(65) Prior Publication Data

US 2022/0169957 A1 Jun. 2, 2022

(30) Foreign Application Priority Data

Aug. 4, 2020 (WO) ................ PCT/US2020/070351

(51) Int. Cl.

| | |
|---|---|
| ***C11D 3/33*** | (2006.01) |
| ***A47L 15/44*** | (2006.01) |
| ***B08B 3/08*** | (2006.01) |
| ***B08B 3/10*** | (2006.01) |
| ***C11D 1/66*** | (2006.01) |
| ***C11D 3/08*** | (2006.01) |
| ***C11D 3/10*** | (2006.01) |
| ***C11D 3/28*** | (2006.01) |
| ***C11D 3/32*** | (2006.01) |
| ***C11D 3/36*** | (2006.01) |
| ***C11D 3/386*** | (2006.01) |
| ***C11D 3/39*** | (2006.01) |
| ***C11D 3/395*** | (2006.01) |
| ***C11D 7/54*** | (2006.01) |
| ***C11D 11/00*** | (2006.01) |
| ***C11D 17/04*** | (2006.01) |

(52) U.S. Cl.

CPC ...... *C11D 11/0023* (2013.01); *A47L 15/4436* (2013.01); *B08B 3/08* (2013.01); *B08B 3/10* (2013.01); *C11D 1/66* (2013.01); *C11D 3/08* (2013.01); *C11D 3/10* (2013.01); *C11D 3/28* (2013.01); *C11D 3/32* (2013.01); *C11D 3/33* (2013.01); *C11D 3/361* (2013.01); *C11D 3/386* (2013.01); *C11D 3/38609* (2013.01); *C11D 3/3905* (2013.01); *C11D 3/392* (2013.01); *C11D 3/3951* (2013.01); *C11D 17/044* (2013.01); *C11D 17/045* (2013.01)

(58) Field of Classification Search

CPC .. C11D 1/66; C11D 3/33; C11D 3/361; C11D 3/386; C11D 3/3905; C11D 3/392; C11D 17/04; C11D 17/045; B08B 3/08; B08B 3/10

USPC ....... 510/220, 226, 233, 376, 439, 392, 467, 510/499, 500, 509; 134/25.2

See application file for complete search history.

(56) References Cited

U.S. PATENT DOCUMENTS

| | | | | |
|---|---|---|---|---|
| 5,900,395 A * | 5/1999 | Nicholson | ............ | C11D 3/3945 510/224 |
| 2016/0222323 A1 | 8/2016 | Letzelter et al. | | |
| 2017/0226450 A1 | 8/2017 | Hartmann et al. | | |
| 2019/0161706 A1* | 5/2019 | Watson | .................... | C11D 1/72 |
| 2020/0362268 A1* | 11/2020 | Watson | .................... | C11D 3/10 |

FOREIGN PATENT DOCUMENTS

| | | |
|---|---|---|
| WO | 2015124384 A1 | 8/2015 |
| WO | 2016126568 A1 | 8/2016 |

OTHER PUBLICATIONS

All Office Actions; U.S. Appl. No. 17/392,313, filed Aug. 3, 2021.
PCT Search Report and Written Opinion for PCT/US2020/070351 dated May 4, 2021, 14 pages.
Extended European Search Report and Search Opinion; Application No. 21189293.0: dated Dec. 23, 2021; 9 pages.
Unpublished U.S. Appl. No. 17/392,313, filed Aug. 3, 2021, to Nevena Lukic et al.

* cited by examiner

*Primary Examiner* — Gregory R Delcotto
(74) *Attorney, Agent, or Firm* — Carolyn S. Powell

(57) ABSTRACT

A method of cleaning soiled ware in a dishwasher the method having the step of using a water-soluble pouch, the pouch comprising a phosphate-free cleaning composition wherein the cleaning composition comprises loose powder and the composition comprises bleach, metal bleach catalyst and a complexing agent and wherein the complexing agent is slowly released as compared to the bleach catalyst.

14 Claims, No Drawings

AUTOMATIC DISHWASHING METHOD

FIELD OF THE INVENTION

The present invention is in the field of automatic dishwashing. In particular it relates to a method that provides effective cleaning, in particular tea cleaning. The method provides good removal of tea stains even when used in hard water and even when the water comprises a high level of bicarbonate. The invention also relates to a water-soluble pouch and the use of the method and pouch to provide tea stain removal.

BACKGROUND OF THE INVENTION

Automatic dishwashing is expected to leave items clean and shiny, i.e., devoid of soil residues, filming and spotting. Tea stains seem to be one of the toughest stains to remove from ware in automatic dishwashing.

WO2015/124384A1 provides a zero-phosphate machine dish wash composition in unit dose format comprising non-phosphate builder, alkali percarbonate, a manganese bleach catalyst in relative low amounts and one or more polycarboxylate polymers. The builder comprises one or more from methylglycine-N,N-diacetic acid and/or one or more salts thereof, citric acid and/or one or more salts thereof, and glutamic acid-N,N-diacetic acid and/or one or more salts thereof. The polycarboxylate polymers have a weight average molecular weight of between 1000 and 100,000, the polymers comprising at least 20% mol of acrylate monomers and from 0 to 40% mol of maleate monomers. The composition is said to provide improved tea stain removal upon use.

Although many attempts have been made in the past, there is still an unmet need to remove tea stains and at the same time provide good cleaning and shine in automatic dishwashing. It has been found that tea stain removal is highly dependent on the nature of the water used in the automatic dishwashing process. It seems particularly relevant the presence of high levels of hardness and in particular bicarbonate in the water. For energy saving reasons, short cycles are becoming more widely used. Tea stain removal is even more challenging in short cycles.

Recently, water-soluble pouches have become widely used in automatic dishwashing. The dimensions of the pouch are constrained by the dimension of the dishwasher disperser. This limits the amount of chemistry that can be used per wash.

One of the objectives of the present invention is to provide an automatic dishwashing method that provides good tea stain removal across a whole range of water hardness and at the same time good cleaning of other soils and good shine.

SUMMARY OF THE INVENTION

According to the first aspect of the invention, there is provided a method of cleaning soiled ware in a dishwasher. The method involves the use of a water-soluble pouch. The method provides effective cleaning, including tea stain removal across a broad range of water hardness. The pouch comprises a cleaning composition enveloped by a water-soluble film. The composition is phosphate free. The composition comprises a complexing agent, bleach and a bleach catalyst.

According to the method of the invention:

i) all the bleach catalyst is delivered at the beginning of the cleaning cycle, i.e., at least 90% by weight of the bleach catalyst is delivered into the cleaning cycle in less than 1/10 t; and ii) the complexing agent is slowly delivered during the cleaning cycle, i.e., at least 20% by weight of the complexing agent is delivered into the cleaning cycle later than 1/3 t and preferably before 2/3 t.

It can be beneficial to initially deliver a small amount of complexing agent into the cleaning cycle. Without being bound by theory, it is believed that if only a small amount of complexing agent is present at the beginning of the cleaning cycle, the complexing agent would preferentially complex ions coming from the soils and from water hardness. Improved shine has been found when more than 10% by weight of the total complexing agent and less than 50% by weight of the total complexing agent is delivered in a time of less than 1/5 t of the cleaning cycle. The remaining complexing agent is delivered thereafter.

Preferably the bleach catalyst is manganese bleach catalyst. Preferably the complexing agent comprises methylglycine-N,N-diacetic acid and/or salts thereof, more preferably the trisodium salt of methylglycine-N,N-diacetic acid. The slow release of the complexing agent can be achieved by many different means, including having the complexing agent in the form of a coated particle, a densified particle or the complexing agent can be arranged in the form a layer within the pouch having higher density than the rest of the powder in the pouch. The complexing agent and the bleach catalyst can be placed in different compartments of the pouch and the compartments can be designed to release the bleach catalyst first and the complexing agent second. Alternatively, the bleach catalyst and the complexing agent are located in the same compartment of the pouch.

Preferably the cleaning composition of the method of the invention comprises more than 0.5% by weight of the composition of a phosphonate, more preferably more than 1% of phosphate, more preferably more than 5% of HEDP. It has been found that compositions comprising this high level of phosphonate provide even better tea cleaning. Preferably, the bleach catalyst is manganese bleach catalyst, the complexing agent comprises MGDA and/or a salt thereof, more preferably the trisodium salt. Preferably, the bleach is percarbonate.

According to the second aspect of the invention, there is provided a pouch suitable for use in the method of the invention. The pouch is adapted to provide slow release of the complexing agent. The pouch comprises a cleaning composition and an enveloping material. The cleaning composition comprises loose powder. The pouch may comprise a single compartment or a plurality of compartments (multi-compartment pouch). In the case of a multi-compartment pouch, at least one of the compartments comprise a composition in the form of loose powder. The pouch is water-soluble.

According to the third aspect of the invention there is provided the use of the method or pouch of the invention to provide tea cleaning in automatic dishwashing using hard water comprising bicarbonate.

The elements of the method of the invention described in connection with the first aspect of the invention apply mutatis mutandis to the other aspects of the invention.

DETAILED DESCRIPTION OF THE INVENTION

All percentages, ratios and proportions used herein are by weight percent of the composition, unless otherwise specified. All average values are calculated "by weight" of the composition, unless otherwise expressly indicated. All ratios are calculated as a weight/weight level, unless otherwise specified.

All measurements are performed at 25° C. unless otherwise specified.

Unless otherwise noted, all component or composition levels are in reference to the active portion of that component or composition, and are exclusive of impurities, for example, residual solvents or by-products, which may be present in commercially available sources of such components or compositions.

The present invention envisages a method of automatic dishwashing, in particular a method of cleaning soiled ware in a dishwasher, preferably in a domestic dishwasher. By "ware" is herein understood any kitchenware, dishware and tableware, i.e any utensil used for either cooking or serving food/drinks. The method of the invention provides effective cleaning, in particular tea stain removal, while at the same time leaving the washed items shiny and providing care for the items. The method uses a water-soluble enveloping material, such as a film, to encase a cleaning composition forming a pouch. The composition in the pouch of the invention is sometimes herein referred to as "the composition of the invention". The composition is phosphate free. By "phosphate free" is herein meant that the composition comprises less than 10%, preferably less than 0.5% by weight of the composition of phosphate. The composition comprises a complexing agent, bleach and a bleach catalyst.

The cleaning composition comprises a loose powder. By "loose-powder" is herein meant a powder comprising a plurality of independent particles, i.e., the particles are not bound to one another. When the loose powder is delivered into the dishwasher the particles in the wash liquor are found as individual entities rather than in the form of a single entity constituted by a plurality of particles. Loose-powder enveloped by water-soluble material is considered "loose powder" for the purpose of the invention. Once the particles are released from the enveloping material the particles are found in the wash liquor as individual entities. Pressed tablets are not considered loose powder within the meaning of the invention.

The method of the invention provides slow release of the complexing agent versus the release of the bleach catalyst to the wash liquor. By "slow release" is meant that not all the complexing agent is delivered simultaneously at the beginning of the cleaning cycle. Substantially all the bleach catalyst is delivered to the wash liquor at the beginning of the cleaning cycle. The complexing agent can be continuously released or released in a pulsed manner, preferably the complexing agent is delivered in a pulsed manner. Without being bound by theory, it is believed that if all the bleach catalyst and all the complexing agent are present in the wash liquor at the same time, the complexing agent complexes the metal centers of the bleach catalyst, decreasing its activity. The higher concentration of the complexing agent favors this complexation. It is believed that tea stains can be efficiently removed by firstly bleaching the top layer (by "top layer" is herein meant the layer furthest away from the surface of the ware) of the stains followed by detachment of the bottom layer by the action of the complexing agent. The complexing agent removes calcium bridges between the bottom layer of the bleachable stain and the surface of the ware.

The slow delivery of complexing agent of the method of the invention minimizes the interaction between the catalyst and the complexing agent in the wash and at the same time contributes to improved cleaning. The bleach is preferably delivered at the same time as the bleach catalyst.

A dishwasher can usually provide a plurality of programs, such as a basic wash program, for washing normally dirty ware dried up to a certain extent; an intensive wash program, for washing very dirty ware, or in case of food rests particularly difficult to remove (very dry or burnt spots); an economy wash program, for washing lightly dirty ware or partial loads of ware; fast wash program, for a washing like the previous cycle, should a faster washing of partial ware loadings be wished. Each program comprises a plurality of sequential steps, herein referred to as "cycles". Usually, one or two cold prewash cycles, a cleaning cycle (also known as main wash), a cold rinse cycle, a hot rinse cycle and optionally a drying cycle. During the cleaning cycle, the water-soluble pouch is added to the water in the dishwasher and the pouch releases the cleaning composition to form the wash liquor. For the purpose of this invention, t=0 is when the pouch is delivered into the cleaning cycle (i.e., into the wash water hold on the body of the dishwasher), usually the pouch is delivered via the dishwasher dispenser. In cases where the dispenser is used to deliver the pouch, t=0 is when the dispenser opens. The duration of the cleaning cycle, "t", is considered to be the time from the moment in which the pouch is delivered into the cleaning cycle until the time when the wash liquor is drained.

The method of the invention requires that at least 90% by weight of the bleach catalyst is delivered into the cleaning cycle in less than 1/10 t. The composition of the invention is designed to deliver to the wash water the bleach catalyst, or at least most of it, before most of the complexing agent. The bleach catalyst is preferably fully delivered before any of the complexing agent, preferably within the first minute of the cleaning cycle.

The method of the invention also requires that at least 20% by weight of the complexing agent is delivered into the cleaning cycle later than 1/3 t. For example, if the total amount of complexing agent to be delivered into the cleaning cycle is 6 grams and the length of the cleaning cycle is 20 minutes, 4.8 grams would be delivered within the 6 first minutes and the remaining 1.2 grams would have to delivered after 6 minutes and preferably before 12 minutes from the start of the cleaning cycle. Preferably less than 80%, more preferably less than 60% by weight of the complexing agent is delivered with in a third of the length of the cleaning cycle (i.e., 1/3 t).

Preferably, at least 40%, more preferably at least 50% by weight of the complexing agent is delivered into the cleaning cycle later than 1/2 t and preferably before 2/3 t.

Preferably, no complexing agent or a small amount of complexing agent would be delivered at the beginning of the cycle. Preferably, more than 10% and less than 50% by weight of the complexing agent is delivered in less than 1/5 t.

The pouch of the invention comprises a composition comprising loose powder. The pouch of the invention is very well suited to be presented in the form of a multi-compartment pouch, more in particular a multi-compartment pouch comprising compartments with compositions in different physical forms, for example a compartment comprising a composition in the form of loose powder and one or more compartments comprising a composition in liquid form. The composition is preferably enveloped by a water-soluble film such as polyvinyl alcohol. The composition comprises a complexing agent, bleach, bleach catalyst and preferably a phosphonate, optionally but preferably the composition comprises a builder, non-ionic surfactant, enzymes, and glass and/or metal care agents. Preferably, the composition comprises the tri-sodium salt of MGDA, HEDP, polymer preferably a sulfonated polymer comprising 2-acrylamido-2-methylpropane sulfonic acid monomers, sodium carbonate, a bleach, preferably sodium percarbonate, a bleach activator, preferably TAED, a bleach catalyst, preferably a manganese bleach catalyst and optionally but preferably protease and amylase enzymes, and non-ionic surfactant. The composition may be free of citrate. The composition can further comprise a cationic polymer that provides anti-spotting benefits.

The composition of the invention preferably has a pH as measured in 1% weight/volume aqueous solution in distilled water at 20° C. of from about 9 to about 12, more preferably from about 10 to less than about 11.5 and especially from about 10.5 to about 11.5.

The composition of the invention preferably has a reserve alkalinity of from about 10 to about 20, more preferably from about 12 to about 18 at a pH of 9.5 as measured in NaOH with 100 mL of product at 20° C.

Complexing Agent

Complexing agents are materials capable of sequestering hardness ions, particularly calcium and/or magnesium. The composition of the invention can comprise a high level of complexing agent, however the level should not be too high otherwise enzymes, in particular proteases can be negatively affected. Too high level of complexing agent can also negatively impact on glass care.

The composition of the invention may comprise from 15% to 50%, preferably from 20% to 40%, more preferably from 20% to 35% by weight of the composition of a complexing agent selected from the group consisting of methylglycine-N,N-diacetic acid (MGDA), glutamic acid-N,N-diacetic acid (GLDA), iminodisuccinic acid (IDS), citric acid, aspartic acid-N,N-diacetic acid (ASDA) its salts and mixtures thereof. Especially preferred complexing agent for use herein is a salt of MGDA, in particular the trisodium salt of MGDA. Mixture of citrate and the trisodium salt of MGDA are also preferred for use herein. Preferably, the composition of the invention comprises from 15% to 40% by weight of the composition of the trisodium salt of MGDA.

The complexing agent of the composition of the invention is delivered into the cleaning cycle in a slow manner, that it can be achieved by controlled release means.

The controlled release means may include any suitable particle with a coating or mixture of coatings designed to provide the controlled release. The coating may, for example, comprise a sparingly water-soluble material, or be a coating of sufficient thickness that the kinetics of dissolution of the thick coating provide the controlled rate of release. The complexing agent is not considered to be delivered into the cleaning cycle when the coated particles are delivered into the cleaning cycle but when the complexing agent is released from the coating, by for example, melting, disintegration and/or dissolution of the coating.

Suitable coating materials include triglycerides (e.g. partially hydrogenated vegetable oil, soy bean oil, cotton seed oil) mono or diglycerides, microcrystalline waxes, gelatin, cellulase, fatty acids and any mixtures thereof.

Other suitable coating materials can comprise the alkali and alkaline earth metal sulphates, silicates and carbonates, including calcium carbonate and silicas.

Preferred coating material is sodium silicate of $SiO2$: $Na2O$ ratio from 1.6:1 to 3.4:1, preferably 2.2:1 to 2.8:1, applied as an aqueous solution to give a level of from 2% to 10%, (normally from 3% to 5%) of silicate solids by weight of the percarbonate. Magnesium silicate can also be included in the coating.

Any inorganic salt coating materials may be combined with organic binder materials to provide composite inorganic salt/organic binder coatings. Suitable binders include the C10-C20 alcohol ethoxylates containing from 5-100 moles of ethylene oxide per mole of alcohol and more preferably the C15-C20 primary alcohol ethoxylates containing from 20-100 moles of ethylene oxide per mole of alcohol.

Other preferred binders include certain polymeric materials. Polyvinylpyrrolidones with an average molecular weight of from 12,000 to 700,000 and polyethylene glycols (PEG) with an average molecular weight of from 600 to 5×10^6 preferably 1000 to 400,000 most preferably 1000 to 10,000 are examples of such polymeric materials. Copolymers of maleic anhydride with ethylene, methylvinyl ether or methacrylic acid, the maleic anhydride constituting at least 20 mole percent of the polymer are further examples of polymeric materials useful as binder agents. These polymeric materials may be used as such or in combination with solvents such as water, propylene glycol and the above mentioned C10-C20 alcohol ethoxylates containing from 5-100 moles of ethylene oxide per mole. Further examples of binders include the C10-C20 mono- and diglycerol ethers and also the C10-C20 fatty acids.

Cellulose derivatives such as methylcellulose, carboxymethylcellulose, ethyl hydroxyethylcellulose and hydroxyethylcellulose, and homo- or co-polymeric polycarboxylic acids or their salts are other examples of binders suitable for use herein. One method for applying the coating material involves agglomeration. Preferred agglomeration processes include the use of any of the organic binder materials described hereinabove. Any conventional agglomerator/mixer may be used including, but not hinted to pan, rotary drum and vertical blender types. Molten coating compositions may also be applied either by being poured onto, or spray atomized onto a moving bed of bleaching agent.

Other means for providing controlled release relate to a capsule for controlled release of an ingredient contained therein, in particular water-soluble capsules for controlled release of an ingredient. For delayed release, the capsule may consist of (a) a capsule shell including a water-soluble polymer (e.g. polyvinyl alcohol grade resins) and defining a sealed interior capsule volume, wherein the capsule shell has a wall thickness in a range of about 100 μm to about 5000 μm and (b) an ingredient for delayed release contained in the sealed interior capsule volume (e.g. an organic complexing agent). At a particular wall thickness, this could result in the release of the contained ingredient after about 5 minutes, or 10 minutes or even 15 minutes. For controlled release, allowing the release of an ingredient over time, the same capsule could be used, with the addition of a pinhole to permit communication between the interior capsule volume and an environment external to the capsule shell allowing the controlled release of the contained ingredient from inside the interior capsule volume to the external environment (e.g. the wash water). At a particular size of the pinhole, this could result in the release of the contained ingredient steadily over the course of about 5 minutes, or even 10 minutes.

Other means of providing the required controlled release include mechanical means for altering the physical characteristics of the complexing agent to control its solubility and rate of release. Suitable means could include compaction, mechanical injection, manual injection, and adjustment of the solubility of the complexing agent by selection of particle size of any particulate component. The complexing agent can be extruded and formed into pellets or other shapes. The pellets may be of different sizes.

If the complexing agent is in the form of particles the particles may have different sizes to provide different delivering times of the complexing agent into the wash liquour. Additional means of controlled release include the suitable choice of any other components of the detergent composition matrix such that when the composition is introduced to the wash solution the ionic strength environment therein provided enables the required controlled release kinetics to be achieved.

Bleach

The composition of the invention preferably comprises from about 8 to about 30%, more preferably from about 9 to about 25%, even more preferably from about 9 to about 20% of bleach by weight of the composition. Preferably the composition of the invention comprises sodium percarbonate. Preferably the bleach is delivered at the same time as the bleach catalyst.

Inorganic and organic bleaches are suitable for use herein. Inorganic bleaches include perhydrate salts such as perborate, percarbonate, persulfate and persilicate salts. The inorganic perhydrate salts are normally the alkali metal salts. The inorganic perhydrate salt may be included as the crystalline solid without additional protection. Alternatively, the salt can be coated. Suitable coatings include sodium sulphate, sodium carbonate, sodium silicate and mixtures thereof. Said coatings can be applied as a mixture applied to the surface or sequentially in layers.

Alkali metal percarbonates, particularly sodium percarbonate is the preferred bleach for use herein. The percarbonate is most preferably incorporated into the products in a coated form which provides in-product stability.

Potassium peroxymonopersulfate is another inorganic perhydrate salt of utility herein.

Typical organic bleaches are organic peroxyacids, especially dodecanediperoxoic acid, tetradecanediperoxoic acid, and hexadecanediperoxoic acid. Mono- and diperazelaic acid, mono- and diperbrassylic acid are also suitable herein. Diacyl and Tetraacylperoxides, for instance dibenzoyl peroxide and dilauroyl peroxide, are other organic peroxides that can be used in the context of this invention.

Further typical organic bleaches include the peroxyacids, particular examples being the alkylperoxy acids and the arylperoxy acids. Preferred representatives are (a) peroxybenzoic acid and its ring-substituted derivatives, such as alkylperoxybenzoic acids, but also peroxy-α-naphthoic acid and magnesium monoperphthalate, (b) the aliphatic or substituted aliphatic peroxy acids, such as peroxylauric acid, peroxystearic acid, ε-phthalimidoperoxycaproic acid[phthaloiminoperoxyhexanoic acid (PAP)], o-carboxybenzamidoperoxycaproic acid, N-nonenylamidoperadipic acid and N-nonenylamidopersuccinates, and (c) aliphatic and araliphatic peroxydicarboxylic acids, such as 1,12-diperoxycarboxylic acid, 1,9-diperoxyazelaic acid, diperoxysebacic acid, diperoxybrassylic acid, the diperoxyphthalic acids, 2-decyldiperoxybutane-1,4-dioic acid, N,N-terephthaloyldi (6-aminopercaproic acid).

Bleach Catalyst

The composition herein contains a bleach catalyst, preferably a metal containing bleach catalyst. More preferably the metal containing bleach catalyst is a transition metal containing bleach catalyst, especially a manganese or cobalt-containing bleach catalyst.

Bleach catalysts preferred for use herein include manganese triazacyclononane and related complexes; Co, Cu, Mn and Fe bispyridylamine and related complexes; and pentamine acetate cobalt(III) and related complexes.

Preferably the composition of the invention comprises from 0.001 to 0.5, more preferably from 0.002 to 0.05% of bleach catalyst by weight of the composition. Preferably the bleach catalyst is a manganese bleach catalyst, more preferably manganese 1,4,7-trimethyl-1,4,7-triazocyclononane.

Bleach Activators

Bleach activators are typically organic peracid precursors that enhance the bleaching action in the course of cleaning at temperatures of 60° C. and below. Bleach activators suitable for use herein include compounds which, under perhydrolysis conditions, give aliphatic peroxoycarboxylic acids having preferably from 1 to 12 carbon atoms, in particular from 2 to 10 carbon atoms, and/or optionally substituted perbenzoic acid. Suitable substances bear O-acyl and/or N-acyl groups of the number of carbon atoms specified and/or optionally substituted benzoyl groups. Preference is given to polyacylated alkylenediamines, in particular tetraacetylethylenediamine (TAED), acylated triazine derivatives, in particular 1,5-diacetyl-2,4-dioxohexahydro-1,3,5-triazine (DADHT), acylated glycolurils, in particular tetraacetylglycoluril (TAGU), N-acylimides, in particular N-nonanoylsuccinimide (NOSI), acylated phenolsulfonates, in particular n-nonanoyl- or isononanoyloxybenzenesulfonate (n- or iso-NOBS), decanoyloxybenzoic acid (DOBA), carboxylic anhydrides, in particular phthalic anhydride, acylated polyhydric alcohols, in particular triacetin, ethylene glycol diacetate and 2,5-diacetoxy-2,5-dihydrofuran and also triethylacetyl citrate (TEAC). If present the composition of the invention comprises from 0.01 to 5, preferably from 0.2 to 2% by weight of the composition of bleach activator, preferably TAED. Preferably the bleach activator is delivered at the same time as the bleach.

Phosphonate

The composition of the invention comprises a high level of phosphonate, preferably HEDP. It comprises preferably from 1% to 7%, more preferably 1% to 6% by weight of the composition of HEDP.

Polymer

The polymer, if present, is used in any suitable amount from about 0.1% to about 30%, preferably from 0.5% to about 20%, more preferably from 1% to 15% by weight of the second composition. Sulfonated/carboxylated polymers are particularly suitable for the second composition.

Suitable sulfonated/carboxylated polymers described herein may have a weight average molecular weight of less than or equal to about 100,000 Da, or less than or equal to about 75,000 Da, or less than or equal to about 50,000 Da, or from about 3,000 Da to about 50,000, preferably from about 5,000 Da to about 45,000 Da.

Preferred sulfonated monomers include one or more of the following: 1-acrylamido-1-propanesulfonic acid, 2-acrylamido-2-propanesulfonic acid, 2-acrylamido-2-methyl-1-propanesulfonic acid, 2-methacrylamido-2-methyl-1-propanesulfonic acid, 3-methacrylamido-2-hydroxy-propanesulfonic acid, allylsulfonic acid, methallylsulfonic acid, allyloxybenzenesulfonic acid, methallyloxybenzenesulfonic acid, 2-hydroxy-3-(2-propenyloxy) propanesulfonic acid, 2-methyl-2-propen-1-sulfonic acid, styrenesulfonic acid, vinylsulfonic acid, 3-sulfopropyl, 3-sulfo-propylmethacrylate, sulfomethacrylamide, sulfomethylmethacrylamide and mixtures of said acids or their water-soluble salts.

Preferably, the polymer comprises the following levels of monomers: from about 40 to about 90%, preferably from about 60 to about 90% by weight of the polymer of one or more carboxylic acid monomer; from about 5 to about 50%, preferably from about 10 to about 40% by weight of the polymer of one or more sulfonic acid monomer; and optionally from about 1% to about 30%, preferably from about 2 to about 20% by weight of the polymer of one or more non-ionic monomer. An especially preferred polymer comprises about 70% to about 80% by weight of the polymer of at least one carboxylic acid monomer and from about 20% to about 30% by weight of the polymer of at least one sulfonic acid monomer.

In the polymers, all or some of the carboxylic or sulfonic acid groups can be present in neutralized form, i.e. the acidic hydrogen atom of the carboxylic and/or sulfonic acid group in some or all acid groups can be replaced with metal ions, preferably alkali metal ions and in particular with sodium ions. The carboxylic acid is preferably (meth)acrylic acid. The sulfonic acid monomer is preferably 2-acrylamido-2-propanesulfonic acid (AMPS).

Preferred commercial available polymers include: Alcosperse 240, Aquatreat AR 540 and Aquatreat MPS supplied by Alco Chemical; Acumer 3100, Acumer 2000, Acusol 587G and Acusol 588G supplied by Rohm & Haas; Goodrich K-798, K-775 and K-797 supplied by BF Goodrich; and ACP 1042 supplied by ISP technologies Inc. Particularly preferred polymers are Acusol 587G and Acusol 588G supplied by Rohm & Haas.

Suitable polymers include anionic carboxylic polymer of low molecular weight. They can be homopolymers or copolymers with a weight average molecular weight of less than or equal to about 200,000 g/mol, or less than or equal to about 75,000 g/mol, or less than or equal to about 50,000 g/mol, or from about 3,000 to about 50,000 g/mol, preferably from about 5,000 to about 45,000 g/mol. The polymer may be a low molecular weight homopolymer of polyacrylate, with an average molecular weight of from 1,000 to 20,000, particularly from 2,000 to 10,000, and particularly preferably from 3,000 to 5,000.

The polymer may be a copolymer of acrylic with methacrylic acid, acrylic and/or methacrylic with maleic acid, and acrylic and/or methacrylic with fumaric acid, with a molecular weight of less than 70,000. Their molecular weight ranges from 2,000 to 80,000 and more preferably from 20,000 to 50,000 and in particular 30,000 to 40,000 g/mol. and a ratio of (meth)acrylate to maleate or fumarate segments of from 30:1 to 1:2.

The polymer may be a copolymer of acrylamide and acrylate having a molecular weight of from 3,000 to 100,000, alternatively from 4,000 to 20,000, and an acrylamide content of less than 50%, alternatively less than 20%, by weight of the polymer can also be used. Alternatively, such polymer may have a molecular weight of from 4,000 to 20,000 and an acrylamide content of from 0% to 15%, by weight of the polymer.

Polymers suitable herein also include itaconic acid homopolymers and copolymers.

Alternatively, the polymer can be selected from the group consisting of alkoxylated polyalkyleneimines, alkoxylated polycarboxylates, polyethylene glycols, styrene co-polymers, cellulose sulfate esters, carboxylated polysaccharides, amphiphilic graft copolymers and mixtures thereof.

Surfactant

Surfactants suitable for use herein include non-ionic surfactants, preferably the compositions are free of any other surfactants. Traditionally, non-ionic surfactants have been used in automatic dishwashing for surface modification purposes in particular for sheeting to avoid filming and spotting and to improve shine. It has been found that non-ionic surfactants can also contribute to prevent redeposition of soils.

Preferably the composition of the invention comprises a non-ionic surfactant or a non-ionic surfactant system, more preferably the non-ionic surfactant or a non-ionic surfactant system has a phase inversion temperature, as measured at a concentration of 1% in distilled water, between 40 and 70° C., preferably between 45 and 65° C. By a "non-ionic surfactant system" is meant herein a mixture of two or more non-ionic surfactants. Preferred for use herein are non-ionic surfactant systems. They seem to have improved cleaning and finishing properties and better stability in product than single non-ionic surfactants.

Phase inversion temperature is the temperature below which a surfactant, or a mixture thereof, partitions preferentially into the water phase as oil-swollen micelles and above which it partitions preferentially into the oil phase as water swollen inverted micelles. Phase inversion temperature can be determined visually by identifying at which temperature cloudiness occurs.

The phase inversion temperature of a non-ionic surfactant or system can be determined as follows: a solution containing 1% of the corresponding surfactant or mixture by weight of the solution in distilled water is prepared. The solution is stirred gently before phase inversion temperature analysis to ensure that the process occurs in chemical equilibrium. The phase inversion temperature is taken in a thermostable bath by immersing the solutions in 75 mm sealed glass test tube. To ensure the absence of leakage, the test tube is weighed before and after phase inversion temperature measurement. The temperature is gradually increased at a rate of less than 1° C. per minute, until the temperature reaches a few degrees below the pre-estimated phase inversion temperature. Phase inversion temperature is determined visually at the first sign of turbidity.

Suitable nonionic surfactants include: i) ethoxylated non-ionic surfactants prepared by the reaction of a monohydroxy alkanol or alkyphenol with 6 to 20 carbon atoms with preferably at least 12 moles particularly preferred at least 16 moles, and still more preferred at least 20 moles of ethylene oxide per mole of alcohol or alkylphenol; ii) alcohol alkoxylated surfactants having a from 6 to 20 carbon atoms and at least one ethoxy and propoxy group. Preferred for use herein are mixtures of surfactants i) and ii).

Other suitable non-ionic surfactants are epoxy-capped poly(oxyalkylated) alcohols represented by the formula:

$$R1O[CH2CH(CH3)O]_x[CH2CH2O]_y[CH2CH(OH)R2] \quad (I)$$

wherein R1 is a linear or branched, aliphatic hydrocarbon radical having from 4 to 18 carbon atoms; R2 is a linear or branched aliphatic hydrocarbon radical having from 2 to 26 carbon atoms; x is an integer having an average value of from 0.5 to 1.5, more preferably about 1; and y is an integer having a value of at least 15, more preferably at least 20.

Preferably, the surfactant of formula I, at least about 10 carbon atoms in the terminal epoxide unit [CH2CH(OH) R2]. Suitable surfactants of formula I, according to the present invention, are Olin Corporation's POLY-TERGENT® SLF-18B nonionic surfactants, as described, for example, in WO 94/22800, published Oct. 13, 1994 by Olin Corporation.

The composition preferably comprises from 0.5% to 10%, more preferably from 1% to 8% by weight of the composition of non-ionic surfactant.

Inorganic Builder

The composition of the invention preferably comprises an inorganic builder. Suitable inorganic builders are selected from the group consisting of carbonate, silicate and mixtures thereof. Especially preferred for use herein is sodium carbonate. Preferably the composition of the invention comprises from 5 to 60%, more preferably from 10 to 50% and especially from 15 to 45% of sodium carbonate by weight of the composition. The composition of the present invention may comprise from 2% to 8%, preferably from 3% to 6% by weight of the composition of a crystalline sodium silicate. The crystalline sodium silicate, is preferably a layered silicate and preferably has the composition $NaMSi_xO_{2x+1\cdot y}$ $H_2O$, in which M denotes sodium or hydrogen, x is 1.9 to 4 and y is 0 to 20. The especially preferred silicate for use herein has the formula: $Na_2Si_2O_5$.

Enzymes

In describing enzyme variants herein, the following nomenclature is used for ease of reference: Original amino acid(s):position(s):substituted amino acid(s). Standard enzyme IUPAC 1-letter codes for amino acids are used.

Proteases

The composition of the invention preferably comprises a protease. A mixture of two or more proteases can also contribute to an enhanced cleaning across a broader temperature, cycle duration, and/or substrate range, and provide superior shine benefits, especially when used in conjunction with an anti-redeposition agent and/or a sulfonated polymer.

Suitable proteases include metalloproteases and serine proteases, including neutral or alkaline microbial serine proteases, such as subtilisins (EC 3.4.21.62). Suitable proteases include those of animal, vegetable or microbial origin. In one aspect, such suitable protease may be of microbial origin. The suitable proteases include chemically or genetically modified mutants of the aforementioned suitable proteases. In one aspect, the suitable protease may be a serine protease, such as an alkaline microbial protease or/and a trypsin-type protease. Examples of suitable neutral or alkaline proteases include: (a) subtilisins (EC 3.4.21.62), especially those derived from *Bacillus*, such as *Bacillus* sp., *B. lentus, B. alkalophilus, B. subtilis, B. amyloliquefaciens, B. pumilus, B. gibsonii*, and *B. akibaii* described in WO2004067737, WO2015091989, WO2015091990, WO2015024739, WO2015143360, U.S. Pat. Nos. 6,312,936, 5,679,630, 4,760,025, DE102006022216A1, DE 102006022224A1, WO2015089447, WO2015089441, WO2016066756, WO2016066757, WO2016069557, WO2016069563, WO2016069569.

(b) trypsin-type or chymotrypsin-type proteases, such as trypsin (e.g., of porcine or bovine origin), including the *Fusarium* protease described in WO 89/06270 and the chymotrypsin proteases derived from Cellumonas described in WO 05/052161 and WO 05/052146.

(c) metalloproteases, especially those derived from *Bacillus amyloliquefaciens* described in WO07/044993A2; from *Bacillus, Brevibacillus, Thermoactinomyces, Geobacillus, Paenibacillus, Lysinibacillus* or *Streptomyces* spp. described in WO2014194032, WO2014194054 and WO2014194117; from Kribella alluminosa described in WO2015193488; and from *Streptomyces* and Lysobacter described in WO2016075078.

(d) protease having at least 90% identity to the subtilase from *Bacillus* sp. TY 145, NCIMB 40339, described in WO92/17577 (Novozymes A/S), including the variants of this *Bacillus* sp TY145 subtilase described in WO2015024739, and WO2016066757.

(e) protease having at least 90%, preferably at least 92% identity with the amino acid sequence of SEQ ID NO:85 from WO2016/205755 comprising at least one amino acid substitution (using the SEQ ID NO:85 numbering) selected from the group consisting of 1, 4, 9, 21, 24, 27, 36, 37, 39, 42, 43, 44, 47, 54, 55, 56, 74, 80, 85, 87, 99, 102, 114, 117, 119, 121, 126, 127, 128, 131, 143, 144, 158, 159, 160, 169, 182, 188, 190, 197, 198, 212, 224, 231, 232, 237, 242, 245, 246, 254, 255, 256, and 257, including the variants found in WO2016/205755 and WO2018/118950.

(f) protease having at least 90%, preferably at least 92%, more preferably at least 98% identity with the amino acid sequence of SEQ ID NO:1 from U.S. Pat. No. 10,655,090 B2. A preferred protease has 100% identity with SEQ ID NO:1 from U.S. Pat. No. 10,655,090 B2. Another preferred protease has 1 to 4 modifications with respect to SEQ ID NO:1 from U.S. Pat. No. 10,655,090 B2.

Especially preferred proteases for the detergent of the invention are: (a) polypeptides demonstrating at least 90%, preferably at least 95%, more preferably at least 98%, even more preferably at least 99% and especially 100% identity with the wild-type enzyme from *Bacillus lentus*, comprising mutations in one or more, preferably two or more and more preferably three or more of the following positions, using the BPN' numbering system and amino acid abbreviations as illustrated in WO00/37627, which is incorporated herein by reference: V68A, N76D, N87S, S99D, S99AD, S99A, S101G, S101M, S103A, V104N/I, G118V, G118R, S128L, P129Q, S130A, Y167A, R170S, A194P, V205I, Q206L/D/E, Y209W and/or M222S. and/or (b) protease having at least 95%, more preferably at least 98%, even more preferably at least 99% and especially 100% identity with the amino acid sequence of SEQ ID NO:85 from WO2016/205755 comprising at least one amino acid substitution (using the SEQ ID NO:85 numbering) selected from the group comprising: P54E/G/I/L/Q/S/T/V; S99A/E/H/I/K/M/N/Q/R/T/V; S126A/D/E/F/G/H/I/L/M/N/Q/R/T/V/Y; D127A/E/F/G/H/I/L/M/N/P/Q/S/T/V/W/Y; F128A/C/D/E/G/H/I/K/L/M/N/P/Q/R/S/T/W, A37T, S39E, A47V, T56Y, I80V, N85S, E87D, T114Q, and N242D;

Most preferably the additional protease is either selected from the group of proteases comprising the below mutations (BPN' numbering system) versus either the PB92 wild-type (SEQ ID NO:2 in WO 08/010925) or the subtilisin 309 wild-type (sequence as per PB92 backbone, except comprising a natural variation of N87S).

(i) G118V+S128L+P129Q+S130A (ii) S101M+G118V+S128L+P129Q+S130A (iii) N76D+N87R+G118R+S128L+P129Q+S130A+S188D+N248R (iv) N76D+N87R+G118R+S128L+P129Q+S130A+S188D+V244R (v) N76D+N87R+G118R+S128L+P129Q+S130A vi) V68A+N87S+S101G+V104N (vii) S99AD or selected from the group of proteases comprising one or more, preferably two or more, preferably three or more, preferably four or more of the below mutations versus SEQ ID NO:1 from WO2018/118950:

P54T, S99M, S126A/G, D127E, F128C/D/E/G, A37T, S39E, A47V, T56Y, 180V, N85S, E87D, T114Q, and N242D.

Most preferred for use herein are proteases wherein the protease is a variant having at least 60% identity with the amino acid sequence of SEQ ID NO:1 of WO2019/125894

A1 and comprising at least one amino acid substitution (using the SEQ ID NO: 1 numbering) selected from the group consisting of: X54T; X126A, D, G, V, E, K, I; X127E, S, T, A, P, G, C; and X128E, C, T, D, P, G, L, Y, N and X211L. Preferably, a variant having at least 90% identity with the amino acid sequence of SEQ ID NO:1 and said variant comprising at least one amino acid substitution (using the SEQ ID NO:1 numbering) selected from the group consisting of P54T, S126A, D127E, F128G and M211L Other preferred protease for use herein include a protease wherein the protease is a variant having at least 90% identity with the amino acid sequence of SEQ ID NO:1 of WO2019/245839 A1 and the variant comprises one or more amino acid substitutions at one or more positions corresponding to SEQ ID NO: 1 positions selected from: 1C/D/E/M/N, 21L, 37A, 54A, 73V, 76D/H/N/T, 83G, 84D/E/F, 85I/M, 86I/S/T/V, 87T, 88M/V, 89F/W, 911, 95A/N/S, 96M/Q, 97E, 98M, 99A/F/H/I/K/L/Q/T/W/Y, 102L, 104E, 105L, 106I/V, 108A, 109I, 112C, 114M/N, 115A/E/H/Q, 116A/E/G/H/Q, 118A/D/N, 122C, 124E/Q, 126I/Q/V, 128H/I/L/M/N/Q/S/T/V/Y, 129D/H, 130N, 131D/E/N/P/Q, 135A/D/H/K/L/M/N/Q/T/V/W/Y, 138D/E, 139E/L, 141A/E/F/H/Y, 142A/D/E, 143E/H/K/M/S/V, 156E, and 157C/D/E wherein the amino acid positions of the variant are numbered by correspondence with the amino acid sequence of SEQ ID NO: 1.

Suitable commercially available additional protease enzymes include those sold under the trade names Alcalase®, Savinase®, Primase®, Durazym®, Polarzyme®, Kannase®, Liquanase®, Liquanase Ultra®, Savinase Ultra®, Savinase Evity®, Ovozyme®, Neutrase®, Everlase®, Coronase®, Blaze®, Blaze Ultra®, Blaze Evity® and Esperase® by Novozymes A/S (Denmark); those sold under the tradename Maxatase®, Maxacal®, Maxapem®, Properase®, Purafect®, Purafect Prime®, Purafect Ox®, FN3®, FN4®, Excellase®, Ultimase®, Extremase® and Purafect OXP® by Dupont; those sold under the tradename Opticlean® and Optimase® by Solvay Enzymes; and those available from Henkel/Kemira, namely BLAP (sequence shown in FIG. 29 of U.S. Pat. No. 5,352,604 with the following mutations S99D+S101 R+S103A+V104I+G159S, hereinafter referred to as BLAP), BLAP R (BLAP with S3T+V4I+V199M+V205I+L217D), BLAP X (BLAP with S3T+V4I+V205I) and BLAP F49 (BLAP with S3T+V4I+A194P+V199M+V205I+L217D); and KAP (*Bacillus alkalophilus* subtilisin with mutations A230V+S256G+S259N) from Kao.

Especially preferred for use herein are commercial proteases selected from the group consisting of Properase®, Blaze®, Blaze Evity®, Savinase Evity®, Extremase®, Ultimase®, Everlase®, Savinase®, Excellase®, Blaze Ultra®, BLAP and BLAP variants.

Preferred levels of protease in the product of the invention include from about 0.05 to about 20, more preferably from about 0.5 to about 15 and especially from about 2 to about 12 mg of active protease/g of composition.

Amylases

Preferably the composition of the invention may comprise an amylase. Suitable alpha-amylases include those of bacterial or fungal origin. Chemically or genetically modified mutants (variants) are included. A preferred alkaline alpha-amylase is derived from a strain of *Bacillus*, such as *Bacillus licheniformis, Bacillus amyloliquefaciens, Bacillus stearothermophilus, Bacillus subtilis*, or other *Bacillus* sp., such as *Bacillus* sp. NCBI 12289, NCBI 12512, NCBI 12513, DSM 9375 (U.S. Pat. No. 7,153,818) DSM 12368, DSMZ no. 12649, KSM AP1378 (WO 97/00324), KSM K36 or KSM K38 (EP 1,022,334). Preferred amylases include:

(a) variants described in WO 96/23873, WO00/60060, WO06/002643 and WO2017/192657, especially the variants with one or more substitutions in the following positions versus SEQ ID NO. 12 of WO06/002643:

26, 30, 33, 82, 37, 106, 118, 128, 133, 149, 150, 160, 178, 182, 186, 193, 202, 214, 231, 246, 256, 257, 258, 269, 270, 272, 283, 295, 296, 298, 299, 303, 304, 305, 311, 314, 315, 318, 319, 339, 345, 361, 378, 383, 419, 421, 437, 441, 444, 445, 446, 447, 450, 461, 471, 482, 484, preferably that also contain the deletions of D 183* and G184*.

(b) variants exhibiting at least 90% identity with SEQ ID No. 4 in WO06/002643, the wild-type enzyme from *Bacillus* SP722, especially variants with deletions in the 183 and 184 positions and variants described in WO 00/60060, WO2011/100410 and WO2013/003659 which are incorporated herein by reference.

(c) variants exhibiting at least 95% identity with the wild-type enzyme from *Bacillus* sp. 707 (SEQ ID NO:7 in U.S. Pat. No. 6,093,562), especially those comprising one or more of mutations in the following positions M202, M208, S255, R172, and/or M261. Preferably said amylase comprises one or more of M202L, M202V, M202S, M202T, M2021, M202Q, M202W, S255N and/or R172Q. Particularly preferred are those comprising the M202L or M202T mutations.

(d) variants described in WO 09/149130, preferably those exhibiting at least 90% identity with SEQ ID NO: 1 or SEQ ID NO:2 in WO 09/149130, the wild-type enzyme from *Geobacillus* Stearophermophilus or a truncated version thereof.

(e) variants exhibiting at least 89% identity with SEQ ID NO:1 in WO2016091688, especially those comprising deletions at positions H183+G184 and additionally one or more mutations at positions 405, 421, 422 and/or 428.

(f) variants exhibiting at least 60% amino acid sequence identity with the "PcuAmyl a-amylase" from *Paenibacillus curdlanolyticus* YK9 (SEQ ID NO:3 in WO2014099523).

(g) variants exhibiting at least 60% amino acid sequence identity with the "CspAmy2 amylase" from *Cytophaga* sp. (SEQ ID NO:1 in WO2014164777).

(h) variants exhibiting at least 85% identity with AmyE from *Bacillus subtilis* (SEQ ID NO:1 in WO2009149271).

(i) variants exhibiting at least 90% identity with the wild-type amylase from *Bacillus* sp. KSM-K38 with accession number AB051102.

(j) variants exhibiting at least 80% identity with the mature amino acid sequence of AAI10 from *Bacillus* sp (SEQ ID NO:7 in WO2016180748), preferably comprising a mutation in one or more of the following positions modification in one or more positions 1, 54, 56, 72, 109, 113, 116, 134, 140, 159, 167, 169, 172, 173, 174, 181, 182, 183, 184, 189, 194, 195, 206, 255, 260, 262, 265, 284, 289, 304, 305, 347, 391, 395, 439, 469, 444, 473, 476, or 477

(k) variants exhibiting at least 80% identity with the mature amino acid sequence of the fusion peptide (SEQ ID NO:14 in US 2019/0169546), preferably comprising one or more of the mutations H1*, N54S+V56T, A60V, G109A, R116Q/H+W167F, L173V, A174S, Q172N, G182*, D183*, N195F, V206L/Y, V208L, K391A, K393A, I405L, A421H, A422P, A428T, G476K and/or G478K. Preferred amylases contain both the deletions G182* and G183* and optionally one or more of the following sets of mutations:

1. H1*+G109A+N195F+V206Y+K391A;
2. H1*+N54S+V56T+G109A+A1745+N195F+V206L+K391A+G476K)
3. H1*+N54S+V56T+A60V+G109A+R116Q+W167F+Q172N+L173V+A1745+N195F+V206L+1405L+A421H+A422P+A428T
4. H1*+N545+V56T+G109A+R116Q+A1745+N195F+V206L+1405L+A421H+A422P+A428T;
5. H1*+N545+V56T+G109A+R116H+A1745+N195F+V208L+K393A+G478K;

(l) variants exhibiting at least 80% identity with the mature amino acid sequence of *Alicyclobacillus* sp. amylase (SEQ ID NO:8 in WO2016180748).

The amylase can be an engineered enzyme, wherein one or more of the amino acids prone to bleach oxidation have been substituted by an amino acid less prone to oxidation. In particular it is preferred that methionine residues are substituted with any other amino acid. In particular it is preferred that the methionine most prone to oxidation is substituted. Preferably the methionine in a position equivalent to 202 in SEQ ID NO:2 is substituted. Preferably, the methionine at this position is substituted with threonine or leucine, preferably leucine.

Suitable commercially available alpha-amylases include DURAMYL®, LIQUEZYME®, TERMAMYL®, TERMAMYL ULTRA®, NATALASE®, SUPRAMYL®, STAINZYME®, STAINZYME PLUS®, FUNGAMYL®, ATLANTIC®, INTENSA® and BAN® (Novozymes A/S, Bagsvaerd, Denmark), KEMZYM® AT 9000 Biozym Biotech Trading GmbH Wehlistrasse 27b A-1200 Wien Austria, RAPIDASE®, PURASTAR®, ENZYSIZE®, OPTISIZE HT PLUS®, POWERASE®, PREFERENZ S® series (including PREFERENZ S1000® and PREFERENZ S2000® and PURASTAR OXAM® (DuPont, Palo Alto, California) and KAM® (Kao, 14-10 Nihonbashi Kayabacho, 1-chome, Chuo-ku Tokyo 103-8210, Japan). In one aspect, suitable amylases include ATLANTIC®, STAINZYME®, POWERASE®, INTENSA® and STAINZYME PLUS®, ACHIEVE ALPHA® and mixtures thereof.

Preferably, the product of the invention comprises at least 0.01 mg, preferably from about 0.05 to about 10, more preferably from about 0.1 to about 6, especially from about 0.2 to about 5 mg of active amylase/g of composition.

Preferably, the protease and/or amylase of the composition of the invention are in the form of granulates, the granulates comprise more than 29% of sodium sulfate by weight of the granulate and/or the sodium sulfate and the active enzyme (protease and/or amylase) are in a weight ratio of between 3:1 and 100:1 or preferably between 4:1 and 30:1 or more preferably between 5:1 and 20:1.

Metal Care Agents

Metal care agents may prevent or reduce the tarnishing, corrosion or oxidation of metals, including aluminium, stainless steel and non-ferrous metals, such as silver and copper. Preferably the composition of the invention comprises from 0.1 to 5%, more preferably from 0.2 to 4% and especially from 0.3 to 3% by weight of the product of a metal care agent, preferably the metal care agent is benzo triazole (BTA).

Glass Care Agents

Glass care agents protect the appearance of glass items during the dishwashing process. Preferably the composition of the invention comprises from 0.1 to 5%, more preferably from 0.2 to 4% and specially from 0.3 to 3% by weight of the composition of a metal care agent, preferably the glass care agent is a zinc containing material, specially hydrozincite.

Cationic Polymer

The composition preferably comprises from 0.5 to 5%, preferably from 0.5 to 2% by weight of the composition of cationic polymer. The cationic polymer provides filming benefits. The cationic polymer comprises in copolymerized form from:

i. 60% to 99% by weight of the cationic polymer of at least one monoethylenically unsaturated polyalkylene oxide monomer of the formula I (monomer (A))

I

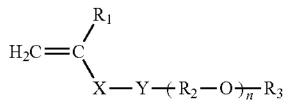

in which the variables have the following meanings:

X is —CH2- or —CO—, if Y is —O—;
X is —CO—, if Y is —NH—;
Y is —O— or —NH—;
R1 is hydrogen or methyl;
R2 are identical or different C2-C6-alkylene radicals;
R3 is H or C1-C4 alkyl;
n is an integer from 3 to 100, preferably from 15 to 60, ii. from 1 to 40% by weight of the cationic polymer of at least one quaternized nitrogen-containing monomer, selected from the group consisting of at least one of the monomers of the formula IIa to IId (monomer (B))

IIa

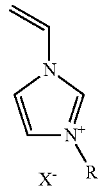

IIb

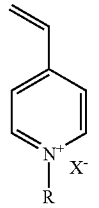

IIc

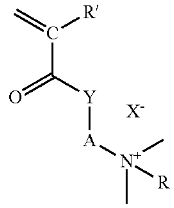

IId

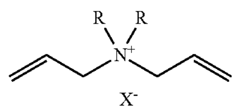

in which the variables have the following meanings:

R is C1-C4 alkyl or benzyl;

R' is hydrogen or methyl;

Y is —O— or —NH—;

A is C1-C6 alkylene;

X— is halide, C1-C4-alkyl sulfate, C1-C4-alkylsulfonate and C1-C4-alkyl carbonate.

iii. from 0 to 15% by weight of the cationic polymer of at least one anionic monoethylenically unsaturated monomer (monomer (C)), and iv. from 0 to 30% by weight of the cationic polymer of at least one other nonionic monoethylenically unsaturated monomer (monomer (D)), and the cationic polymer has a weight average molecular weight (Mw) from 2,000 to 500,000, preferably from 25,000 g/mol to 200,000 g/mol.

In preferred cationic polymers the variables of monomer (A) have the following meanings:

X is —CO—;

Y is —O—;

$R_1$ is hydrogen or methyl;

$R_2$ is ethylene, linear or branched propylene or mixtures thereof;

$R_3$ is methyl;

n is an integer from 15 to 60.

Preferably, the cationic polymer comprises from 60 to 98% by weight of monomer (A) and from 1 to 39% by weight of monomer (B) and from 0.5 to 6% by weight of monomer (C).

In preferred cationic polymers monomer (A) is methylpolyethylene glycol (meth)acrylate and wherein monomer (B) is a salt of 3-methyl-1-vinylimidazolium.

Preferably, the cationic polymer comprises from 69 to 89% of monomer (A) and from 9 to 29% of monomer (B).

In preferred cationic polymers, the weight ratio of monomer (A) to monomer (B) is ≥2:1 and for the case where the copolymer comprises a monomer (C), the weight ratio of monomer (B) to monomer (C) is also ≥2:1, more preferably is ≥2.5:1 and preferably monomer (A) comprises methylpolyethylene glycol (meth)acrylate and monomer (B) comprises a salt of 3-methyl-1-vinylimidazolium.

A preferred composition according to the invention comprises:

a) from 20% to 40% by weight of the composition of MGDA, preferably the trisodium salt of methylglycine-N,N-diacetic acid;

b) from 8% to 30% by weight of the composition of sodium percarbonate;

c) from 0.001% to 0.5% by weight of the composition of a manganese bleach catalyst; and d) from 10% to 30% by weight of the composition of carbonate;

e) from 0.5% to 6% by weight of the composition of HEDP;

f) from 2% to 6% by weight of the composition of a polymer, preferably a sulfonate polymer;

g) non-ionic surfactant;

h) amylase;

i) protease; and optionally j) glass and/or metal care agent.

Method of Automatic Dishwashing

The method of the invention comprises the step of subjecting ware to the pouch of the invention. The method provides very good cleaning in all types of water, i.e., water with different hardness, even with water containing high level of bicarbonate. By "hard water" is herein meant water having from 2.5 to 6.5 mmol/l of calcium and magnesium ions.

EXAMPLES

Two automatic dishwashing cleaning compositions were made as detailed herein below.

I. Preparation of Test Compositions

Tests were carried out using the following compositions:

| | Automatic Dishwashing Composition | |
|---|---|---|
| | 1 | 2 |
| Ingredient | Level (% wt) | |
| Sodium carbonate | 30 | 27 |
| HEDP (Sodium 1-hydroxyethyidene-1,1-diphosphonate) | 1 | 11 |
| Sodium percarbonate | 29 | 26 |
| WeylClean ® FDO X[1] | 2 | 2 |
| Acusol ™ 588GF[2] | 4 | 4 |
| Protease granule | 4 | 4 |
| Amylase granule | 6 | 5 |
| Lutensol ® TO7[3] | 9 | 8 |
| Plurafac ® SLF180[4] | 8 | 7 |
| Processing Aids | Balance to 100% | |

[1]MnTACN (1,4,7-trimethyl-1,4,7-triazacyclononane) + TAED (Tetraacetylethyenediamine) cogranulate supplied by WeylChem
[2]Sulfonated polymer supplied by Dow Chemical
[3]Non-ionic surfactant supplied by BASF
[4]Non-ionic surfactant supplied by BASF II. Test Stains The test stains used were tea cups (Schönwald, 6-8 mm thick) soiled with black assam tea, prepared using the following procedure (taken from Recommendations for the Quality Assessment of the Cleaning Performance of Dishwasher Detergents (Part B, Update 2015) from the IKW working group automatic dishwashing detergents):

1. Prepare 3 mmol Ca and Mg (16.8° d) water and adjust to pH7.5 using HCl or NaOH.
2. Prepare ferric sulphate solution by adding 5 g $Fe_2(SO_4)_3$+1 ml HCl (37%) to one litre of demineralised water.
3. Add 0.2 ml of ferric sulphate to four litres of the 3 mmol water and bring to the boil.
4. Prepare two tea bags, each containing 30 g of Twinnings Assam loose leave team.
5. Once the water is boiled, add the tea bags and leave to brew for five minutes.
6. After the five minutes fill the tea cup with 100 ml of the tea which should be around 93° C.
7. Remove 20 mls of tea every five minutes until the cup is empty.
8. This process is repeated once more with freshly brewed tea.
9. The soiled cups are stored for at least three days at room temperature and humidity before use in performance testing.

III. Additional Ballast Soil 1

To add extra soil stress to the test, a blend of soils is added to the dishwasher, as prepared by the procedure described below

| Ingredient | % content |
|---|---|
| Vegetable oil | 31.6 |
| Margarine | 6.3 |

-continued

| Ingredient | % content |
|---|---|
| Lard | 6.3 |
| Deep-frying fat | 6.3 |
| Whole egg | 15.8 |
| Cream | 9.4 |
| Whole Milk | 6.3 |
| Potato Starch | 2.2 |
| Gravy | 1.7 |
| Wheat Flour | 0.6 |
| Quark Powder | 0.6 |
| Benzoic Acid >99% | 0.3 |
| Tomato Ketchup | 6.3 |
| Mustard | 6.3 |
| Total | 100 |

Soil Preparation

1. Combine the vegetable oil and whole egg and mix thoroughly (approximately 30 minutes).
2. Add ketchup and mustard, still stirring vigorously.
3. Melt the fats, allow to cool to approximately 40° C., then add to the mixture and blend well.
4. Stir in the cream and milk.
5. Add the powdered solid constituents and mix everything to a smooth paste.
6. Put 50 g of the soil mix into plastic pots and freeze.

IV. Test Wash Procedure

Automatic Dishwasher: Miele, model GSL2

Wash volume: 5000 ml

Main Wash Water temperature: 45° C.

Length of the Main Wash 17 minutes (with 8 minutes holding at 45° C.)

Detergent addition: Added into the bottom of the automatic dishwasher when the detergent dispenser opens at the start of the main wash (t=0).

MGDA solution: 5.59 g active of MGDA granule was dissolved in 60 ml demineralized water.

MGDA addition: The MGDA solution was delivered into the main wash at specified times via a plastic tube and syringe without interrupting the cycle. One end of the tube was inside with the other outside of the dishwasher, with the door closed. The tube used was 50-70 cm long, and about 5 mm in diameter.

Positioning of test tea cups: Top rack; 1× left, 1× right.

Additional soil stress: 1×50 g pot of Additional Ballast Soil 1 added to top rack.

[5] Tri-sodium salt of methyl glycine diacetic acid (MGDA)

Example 1

One dose of detergent and separate addition of MGDA solution was added to the automatic dishwasher as shown below. The MGDA solution was dosed as specified in the table below. The third column shown the time on the left-hand side of the "=" symbol and the percentage of MGDA with respect to the total amount of MGDA on the right-hand side of the "=" symbol.

| Example | Composition 1 | Time (seconds) and levels of MGDA solution (% wt weight) |
|---|---|---|
| A (comparative) | 9.64 g | 0 = 20%, 150 = 20%, 300 = 20%, 450 = 20%, 600 = 20% |
| B | 9.64 g | 600 = 100% |
| C (comparative) | 9.64 g | 0 = 40%, 150 = 15%, 300 = 15%, 450 = 15%, 600 = 15% |
| D | 9.64 g | 0 = 40%, 600 = 60% |

A dishwasher was loaded with the above items which were washed using Composition 1 and MGDA solutions dosed as indicated in the table above. The tests were repeated twice, giving 4 replicates of tea cups for each test leg (2 replicates per wash). The items were then graded on a visual scale of 1-10 where 1 is no removal and 10 is full removal of the tea stain. Average tea cup scores are calculated and shown below.

| | Tea Cleaning Grade |
|---|---|
| Water hardness (gpg) | 19 |
| Bicarbonate level (ppm) | 250 |
| Example A | 5.9 |
| Example B | 8.4 |
| Example C | 7.9 |
| Example D | 8.4 |

As can be seen either delaying the release of MGDA or slowing the release over a time period improves tea cleaning.

Example 1

One dose of detergent and a separate addition of MGDA solution was added to the automatic dishwasher as shown below. The MGDA solution was either dosed fully at the start of the main wash alongside Composition 1 or 2 (0=0) or five equal aliquots of the MGDA solution were added at specified intervals over a 600 second period starting at t=0.

| Example | Composition | Time(s) of addition of MGDAsolution (seconds) |
|---|---|---|
| Formula A (comparative) | 9.64 g Composition 1 | 0 |
| Formula B | 9.64 g Composition 1 | 0, 150, 300, 450, 600 |
| Formula C (comparative) | 10.69 g Composition 2 | 0 |
| Formula D | 10.69 g Composition 2 | 0, 150, 300, 450, 600 |

A dishwasher was loaded with the above items which were washed using Formulas A, B, C and D four times, giving 8 replicates of tea cups for each test leg (2 replicates per wash). The items were then graded on a visual scale of 1-10 where 1 is no removal and 10 is full removal of the tea stains. Average tea cup scores are calculated and shown below.

| | Tea Cleaning Grade | |
|---|---|---|
| Water hardness (gpg) | 21 | 23 |
| Bicarbonate level (ppm) | 250 | 350 |
| Formula A (comparative) | 4.3 | 1.5 |
| Formula B | 7.6 | 5.8 |
| Formula C (comparative) | 5.4 | 2.5 |
| Formula D | 9.6 | 10.0 |

As can be seen the delayed release of the addition of MGDA improves tea cleaning. Tea cleaning is improved even further when the cleaning composition comprises higher level of HEDP.

Example 2

One dose of detergent and separate addition of MGDA solution was added to the automatic dishwasher as shown below. The MGDA solution was dosed as specified in the table below. The third column shown the time on the left-hand side of the "=" symbol and the percentage of MGDA with respect to the total amount of MGDA on the right-hand side of the "=" symbol.

| Example | Composition 1 | Time (seconds) and levels of MGDA solution (% wt weight) |
|---|---|---|
| Test A | 9.64 g | 0 = 20%, 150 = 20%, 300 = 20%, 450 = 20%, 600 = 20% |
| Test B | 9.64 g | 600 = 100% |
| Test C | 9.64 g | 0 = 40%, 150 = 15%, 300 = 15%, 450 = 15%, 600 = 15% |
| Test D | 9.64 g | 0 = 40%, 600 = 60% |

A dishwasher was loaded with the above items which were washed using Composition 1 and MGDA solutions dosed as indicated in the table above. The tests were repeated twice, giving 4 replicates of tea cups for each test leg (2 replicates per wash). The items were then graded on a visual scale of 1-10 where 1 is no removal and 10 is full removal of the tea stain. Average tea cup scores are calculated and shown below.

| | Tea Cleaning Grade |
|---|---|
| Water hardness (gpg) | 19 |
| Bicarbonate level (ppm) | 250 |
| Example A | 5.9 |
| Example B | 8.4 |
| Example C | 7.9 |
| Example D | 8.4 |

As can be seen either delaying the release of MGDA or slowing the release over a time period improves tea cleaning.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method of cleaning soiled ware in a dishwasher, using a program comprising a cleaning cycle of length t, the method comprising the step of delivering a water-soluble pouch, to water to form a wash liquor within said dishwasher, and contacting said soiled ware with said wash liquor, the pouch comprising a phosphate-free cleaning composition wherein the cleaning composition comprises loose powder and the composition comprises bleach, metal bleach catalyst and a complexing agent selected from the group consisting of methylglycine-N,N-diacetic acid (MGDA), glutamic acid-N,N-diacetic acid (GLDA), iminodisuccinic acid (IDS), citric acid, aspartic acid —N,N-diacetic acid (ASDA), their salts and mixtures thereof and wherein:

i) at least 90% by weight of the bleach catalyst is delivered into the cleaning cycle in less than 1/10 t; and ii) at least 50% by weight of the complexing agent is delivered into the cleaning cycle later than ½, where t is considered to be the time from the moment in which the pouch is delivered into the cleaning cycle until the time when the wash liquor is drained and t is at least 10 minutes.

2. The method according to claim 1 wherein less than 60% by weight of the complexing agent is delivered into the cleaning cycle before ⅓ t.

3. The method according to claim 1 wherein at least 50% by weight of the complexing agent is delivered into the cleaning cycle at a time before ⅔ t.

4. The method according to claim 1 wherein the complexing agent is delivered at regular intervals.

5. The method according to claim 1 wherein the complexing agent comprises MGDA.

6. The method according to claim 1 wherein the bleach catalyst comprises manganese bleach catalyst.

7. The method according to claim 1 wherein the composition further comprises a bleach activator.

8. The method according to claim 1 wherein the composition further comprises TAED.

9. The method according to claim 1 wherein the composition further comprises silicate.

10. The method according to claim 1 wherein the complexing agent is in the form of a controlled release particle.

11. The method according to claim 1 wherein at least 50% by weight of the complexing agent forms a layer that has higher density than the rest of the composition.

12. A method according to claim 1, wherein said soiled ware comprises tea stains.

13. The method according to claim 1 wherein more than 10% by weight of the complexing agent is delivered in less than ⅕ t.

14. The method according to claim 1 wherein the bleach catalyst comprises manganese 1,4,7-trimethyl-1,4,7-triazocyclononane.

* * * * *